No. 662,971. Patented Dec. 4, 1900.
J. F. RUPERT.
NAILLESS HORSESHOE.
(Application filed Apr. 16, 1900.)

(No Model.)

WITNESSES.
Ralph Sturgeon
Fred Einfeldt

INVENTOR.
John F. Rupert
By Sturgeon
atty.

UNITED STATES PATENT OFFICE.

JOHN F. RUPERT, OF CONNEAUTVILLE, PENNSYLVANIA.

NAILLESS HORSESHOE.

SPECIFICATION forming part of Letters Patent No. 662,971, dated December 4, 1900.

Application filed April 16, 1900. Serial No. 13,084. (No model.)

*To all whom it may concern:*

Be it known that I, JOHN F. RUPERT, a citizen of the United States, residing at Conneautville, in the county of Crawford and State of Pennsylvania, have invented certain new and useful Improvements in Nailless Horseshoes; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to improvements in nailless horseshoes; and it consists, substantially, in making the shoe with dovetailed recesses in the edges thereof and placing hooks therein adapted to engage with the outside surface of a horse's hoof and secure the shoe thereto, as well as in the construction of the hooks therefor, the construction and operation of this invention being hereinafter set forth and described, and illustrated in the accompanying drawings, in which—

Figure 1:
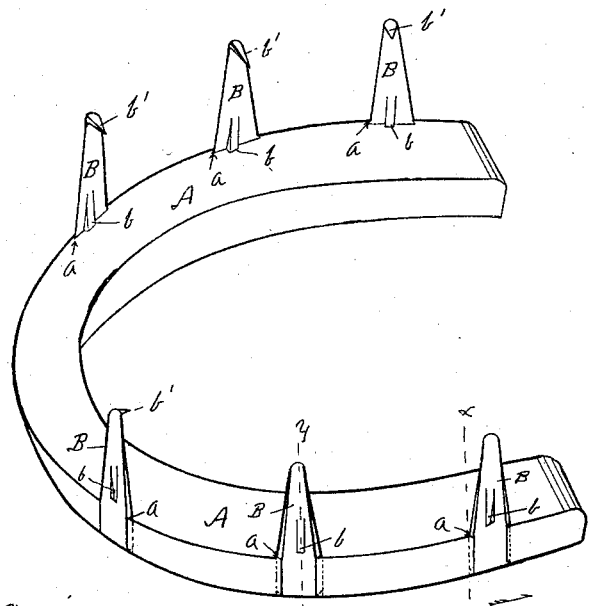
Figure 2:
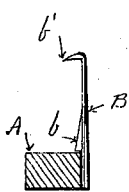
Figure 3:
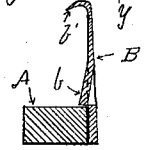
Figure 4:
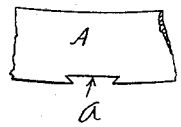

Figure 1 is a perspective view of a horseshoe embodying my invention. Fig. 2 is a transverse section on the line $x\ x$ in Fig. 1. Fig. 3 is a transverse section on the line $y\ y$ in Fig. 1. Fig. 4 is a plan view of a section of the shoe, showing one of the dovetailed slots therein.

In the drawings, A is a horseshoe provided in its outer edges with dovetailed slots $a$, which are preferably slightly wider at the bottoms than at the tops thereof, and B represents hooks having their edges beveled and slightly tapered near their lower ends, so as to fit firmly in the slots $a$ and not pass up through them, but constantly draw tighter therein. In the central parts of the hooks B are tongues $b$, stamped through the hooks at their lower ends, so that when the hooks B are in place in the slots $a$ the lower ends of the tongues $b$ will engage the top of the shoe A and prevent the hooks B from moving downward in the slots $a$. The upper portions of the hooks B being then bent inward and the points $b'$ thereof driven into the horse's hoof, the shoe A is thereby secured firmly in place.

Having thus described my invention so as to enable others to construct and use the same, what I claim as new, and desire to secure by Letters Patent of the United States, is—

1. The combination in a nailless horseshoe, of a shoe having vertical dovetailed slots in its outer edge, with hooks adapted to engage said slots having spring-tongues adapted to engage the upper surface of the shoe, substantially as and for the purpose set forth.

2. A hook for nailless horseshoes, comprising a vertical portion having the edges thereof beveled outward so as to engage vertical dovetailed slots in a horseshoe, an inwardly-projecting hook on its upper end, and a tongue adapted to engage the upper surface of the shoe, substantially as and for the purpose set forth.

In testimony whereof I affix my signature in presence of two witnesses.

JOHN F. RUPERT.

Witnesses:
RALPH A. STURGEON,
CHARLES A. MERTENS.